United States Patent [19]

Touchstone

[11] 4,081,060
[45] Mar. 28, 1978

[54] BRAKE ADJUSTMENT DEVICE FOR CONVERTING DOUBLE SHOE CLASP-TYPE BRAKE ASSEMBLY TO SINGLE SHOE BRAKE ASSEMBLY

[76] Inventor: Roy H. Touchstone, P.O. Box 2003, Jackson, Tenn. 38301

[21] Appl. No.: 752,540

[22] Filed: Dec. 20, 1976

Related U.S. Application Data

[63] Continuation of Ser. No. 661,421, Feb. 26, 1976, abandoned.

[51] Int. Cl.² .............................................. F16D 65/44
[52] U.S. Cl. .................................... 188/197; 74/522; 188/196 M; 188/210
[58] Field of Search ................... 188/197, 196 M, 210, 188/56, 33; 74/522

[56] References Cited

U.S. PATENT DOCUMENTS

| | | | |
|---|---|---|---|
| 3,446,319 | 5/1969 | McLean | 188/197 X |
| 3,752,269 | 8/1973 | Touchstone | 188/197 |
| 3,835,969 | 9/1974 | Touchstone | 188/197 |

Primary Examiner—Trygve M. Blix
Assistant Examiner—Douglas C. Butler
Attorney, Agent, or Firm—Head, Johnson & Chafin

[57] ABSTRACT

A brake adjustment device for locomotives wherein the braking system of a locomotive truck may be converted from a double shoe clasp-type assembly to a single brake shoe assembly, and comprising a pair of brackets adapted to be secured to the locomotive truck between a pair of adjacent or in-line locomotive wheels, an apertured slide rod secured to the outer ends of each bracket and extending in a direction toward the respective in-line wheel, an apertured housing secured to the brake lever of each of the wheels and having one end thereof open for slidably receiving the respective slide rod therein whereby the adjuster may be used in the manner of a turnbuckle for quickly adjusting the brakes for facilitating the replacement or repair of the brakes, a keeper pin cooperating with each respective apertured slide rod and apertured housing for selectively locking the slide rod with the respective housing, and a lever cooperating with each keeper pin for retaining the keeper pins in engagement with the respective apertured slide rod and respective housing.

3 Claims, 9 Drawing Figures

BRAKE ADJUSTMENT DEVICE FOR CONVERTING DOUBLE SHOE CLASP-TYPE BRAKE ASSEMBLY TO SINGLE SHOE BRAKE ASSEMBLY

This is a continuation of application Ser. No. 661,421, filed Feb. 26, 1976, now abandoned.

BACKGROUND OF THE INVENTION

1. Field of the Invention

This invention relates to improvements in brake adjustment devices for locomotives and more particularly, but not by way of limitation, to a quick adjuster device for converting a double clasp-type brake assembly to a single brake shoe assembly.

2. Description of the Prior Art

Locomotives, and particularly diesel locomotives, are normally provided with friction type brake shoes engageable with the outer periphery of the locomotive wheels for slowing or braking the speed thereof. The braking apparatus may be of the type adapted to work with one brake shoe on each wheel, commonly known as single shoe brakes, or with two brake shoes on each wheel, commonly known as a double shoe or clasp-type brake. For many years, the diesel locomotives have used metallic brake shoes which are made from cast iron having certain other ingredients. The coefficient of friction of the metallic shoes when engaged with the steel wheels of the locomotives is such that it has been necessary to provide the locomotives with double shoe or clasp-type brakes in order to obtain a sufficient braking action.

Non-metallic materials have been developed, however, for use with brake shoes in lieu of the former cast iron materials, said new materials normally comprising a composition of rubber, asbestos, and other components. The brake shoes utilizing this non-metallic material have a much higher coefficient of friction when in engagement with the steel wheels than the cast iron shoes. As a result, the braking forces must be reduced to obtain the braking patterns obtained with the iron shoes.

The reduction in braking force may be obtained in many ways, such as by reducing the air pressure arriving at the braking cylinder, or altering the brake rigging leverage ratio. However, the most common manner in which the braking force is reduced has been to convert the double shoe or clasp-type braking system to a single shoe braking system. In order to accomplish this, it is the usual practice to remove the normal common connection between the two brake shoes and replace the connection with a new anchoring or fulcrum point for the remaining brake linkage. Such an anchoring or fulcrum point may be a bracket such as shown in the McLean U.S. Pat. No. 3,446,319, issued May 27, 1969, and entitled "Brake Rigging Modification for Composition Brake Shoes".

Other problems inherent to the single brake shoe system remain, however. For example, the brake shoe wears out relatively rapidly, and it becomes necessary to adjust the slack due to the wear thereon in order to maintain an efficient braking operation. The well-known screw type brake adjusters are not only expensive, but also require a great amount of time for adjusting the slack in the brake system and are particularly time consuming when it is necessary to replace worn brake shoes. Thus, it becomes readily apparent that slide-type brake adjusters, such as that shown in my prior issued patents, U.S. Pat. Nos. 3,613,840 issued Oct. 19, 1971; U.S. Pat. No. 3,752,269 issued Aug. 14, 1973; U.S. Pat. No. 3,835,969 issued Sept. 17, 1974, all entitled "Quick Slack Adjuster for Locomotive Brakes", and U.S. Pat. No. 3,902,577, issued Sept. 2, 1975, and entitled "Brake Adjuster for Locomotive Four Wheel Truck and Single Brake Shoe", would be advantageous for use in combination with a double shoe system which has been converted to a single brake system, but heretofore such a slide-type adjuster for the converted brake system has not been available.

SUMMARY OF THE INVENTION

The present invention contemplates a novel brake adjuster particularly designed for use in connection with a double shoe, clasp-type braking assembly which may be converted to a single brake shoe assembly. The novel brake adjuster comprises bracket means adapted to be secured to the opposite ends of the usual safety strap provided on the locomotive truck between a pair of adjacent or in-line locomotive wheels, and an independent slide bar attached to each bracket means and extending outwardly therefrom in opposite directions and toward the respective in-line wheels. A housing member is slidably disposed over each slide bar, and each housing member terminates at its free end in a sleeve member adapted to be secured to the brake levers in much the same manner as shown in my aforementioned U.S. Pat. Nos. 3,613,840 and 3,752,269. Complementary bores are provided in the slide bars and housing members in order to receive locking or keeper pins therethrough for securely retaining the housing member and respective slide bar in a preselected longitudinal relationship, with the spacing between the bores being such as to provide substantially any desired longitudinal relationship between the slide bar and housing.

Since the slide bars are secured to the safety strap secured to the locomotive truck between the two adjacent in-line wheels, the relative position of the slide bars with respect to the wheels remains stationary. However, the housing members are in a longitudinally reciprocal or floating relationship with respect to the respective slide bars and are in engagement with the brake levers. Thus, when the braking engagement between the brake shoes and the wheels must be adjusted for any reason, it is merely necessary to adjust the relative longitudinal position between the slide bar and respective housing member and lock the two elements in the selected position by the keeper pin. In this manner, the brake shoe adjustment may be accomplished quickly and efficiently.

DESCRIPTION OF THE PREFERRED EMBODIMENT

Figure 1:
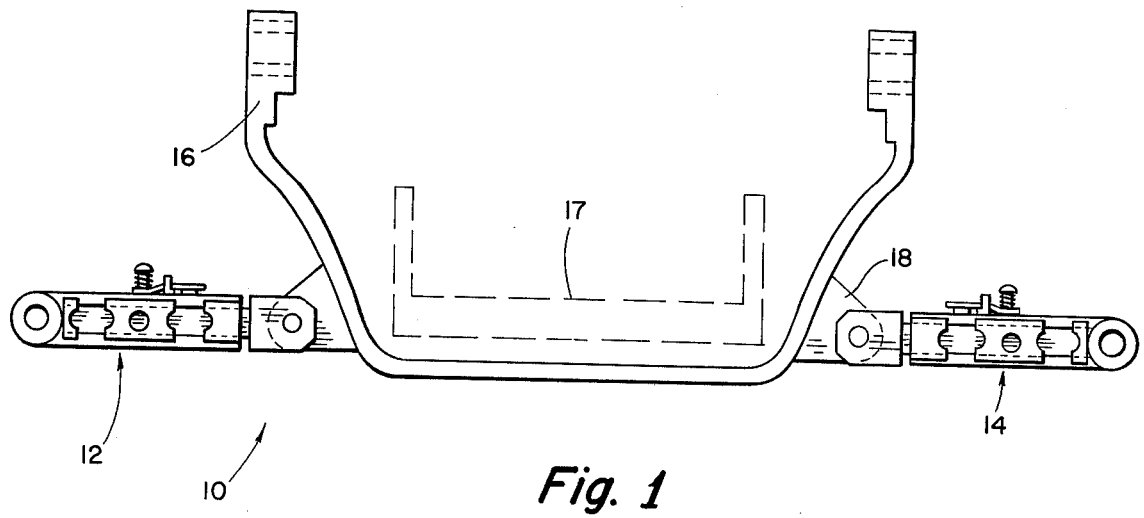
FIG. 1 is a side elevational view of a brake adjuster embodying the invention and illustrated as installed on the usual safety strap of a diesel locomotive engine.
Figure 2:
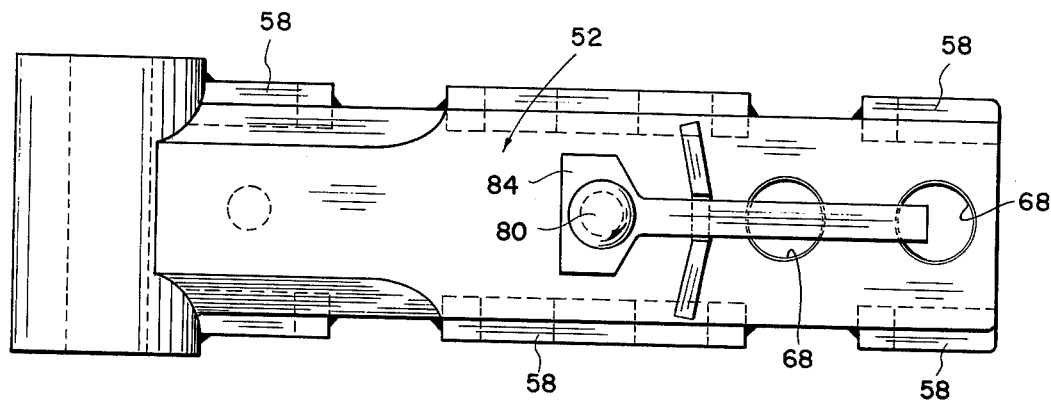
FIG. 2 is a top view of a trunnion of a brake adjuster embodying the invention.

Referring to the drawings in detail, reference character 10 generally indicates a brake adjuster comprising a pair of substantially identical adjuster assemblies 12 and 14 adapted to be secured to the opposite ends of the usual safety strap 16 provided on a diesel locomotive truck 15 and spanning the usual spring plank 17, also normally provided on the diesel locomotive truck. Since the assemblies 12 and 14 are substantially identical but oppositely disposed, only one assembly 12 will be set forth in detail herein.

Figure 8:
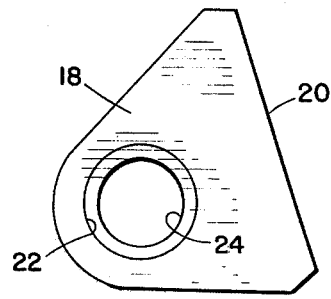
FIG. 8 is a side elevational view of a clevis element of a brake adjuster embodying the invention.
Figure 5:
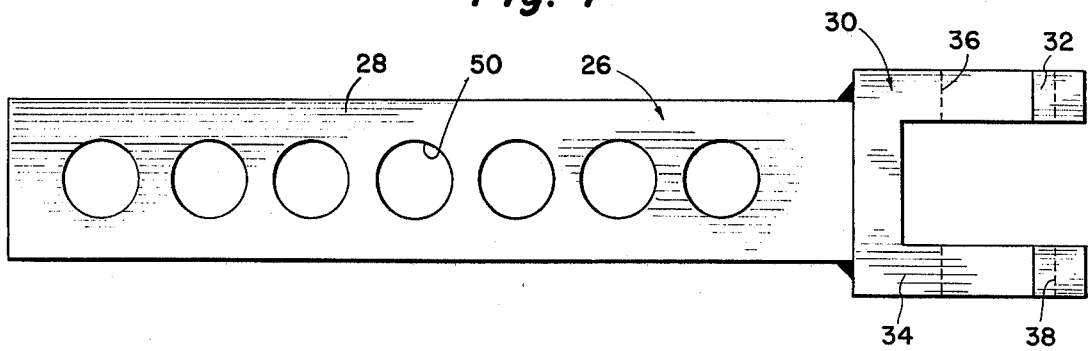
FIG. 5 is a top view of the slide bar element of a brake adjuster embodying the invention.
Figure 6:
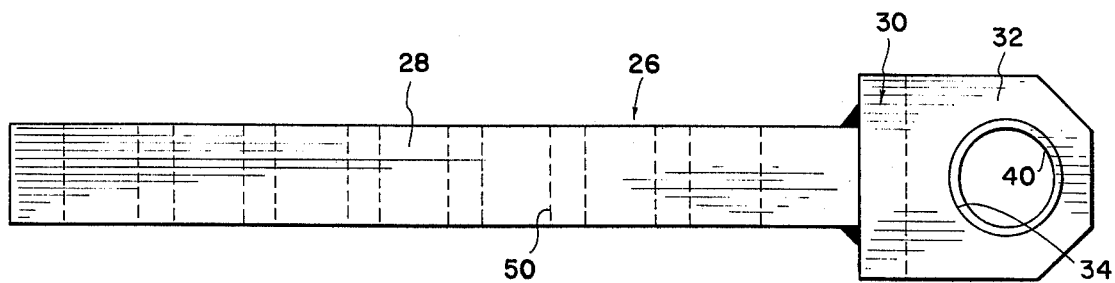
FIG. 6 is a side elevational view of the slide bar element of a brake adjuster of FIG. 5 embodying the invention.
Figure 9:
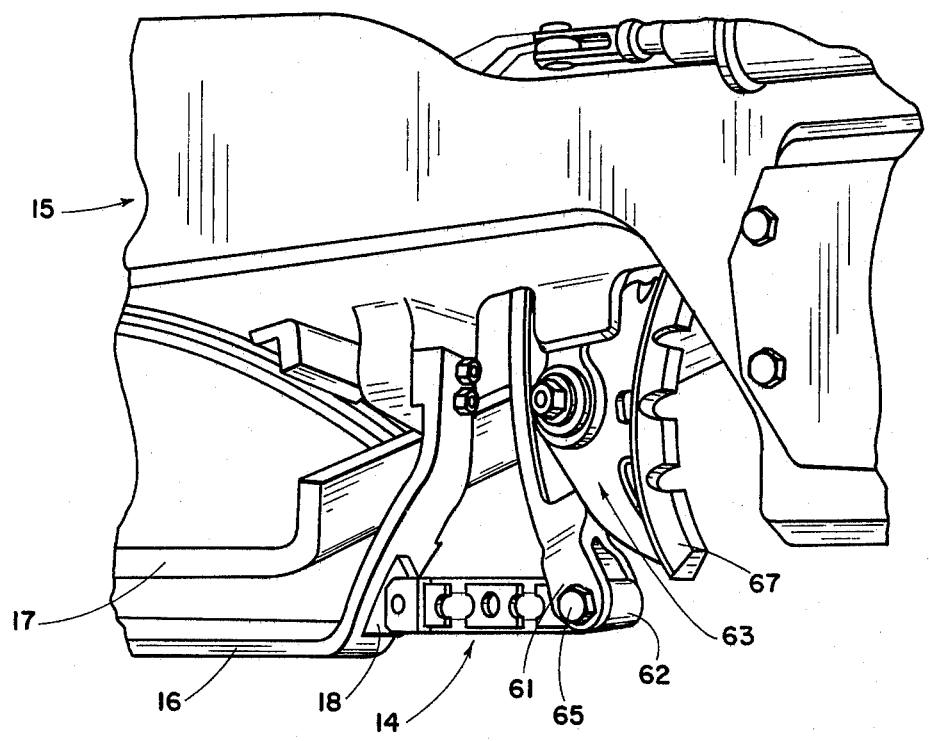
FIG. 9 is a perspective view of a brake adjuster embodying the invention with the wheel of the locomotive truck removed, as seen from outside the truck.

The brake adjuster assembly 12 comprises a plate or bracket member 18, preferably of a substantially triangular configuration as particularly shown in FIGS. 1 and 8, and having one edge 20 adapted for disposition against the outer edge of the strap 16 whereby the bracket 18 may be welded or otherwise rigidly secured thereto. An aperture 22 is provided in the bracket 18 for receiving a suitable bushing sleeve 24 therein for a purpose as will be hereinafter set forth.

Figure 7:
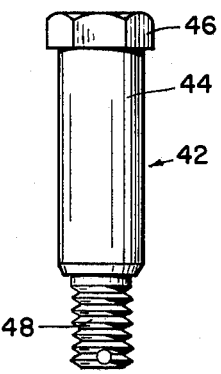
FIG. 7 is a side elevational view of a clevis pin as used in a brake adjuster embodying the invention.

A slide bar, generally indicated at 26, is pivotally secured to the bracket 18 as will be hereinafter set forth and comprises a substantially flat bar element 28 having a bifurcated connector element 30 at one end thereof for receiving the bracket 18 therein. The arms 32 and 34 of the bifurcated element 30 are provided with axially aligned bores 36 and 38, each having a suitable bushing sleeve 40 therein. When the bracket 18 is disposed within the element 30, the arms 32 and 34 will be disposed on the opposite sides of the bracket, and the bushings 24 and 40 will be in alignment for receiving a clevis pin 42 therethrough. The clevis pin 42 may be of any suitable type; and as shown in FIG. 7 comprises a shank member 44 adapted to engage the inner peripheries of the bushings 24 and 40 whereby the slide bar 26 may pivot about the axis of the bushings. In addition, the pin 42 is preferably provided with an enlarged head member 46 at one end thereof for limiting the movement of the pin 42 with respect to the bifurcated element 30 in one direction, and a reduced diameter threaded stud member 48 for receiving a suitable lock nut (not shown) thereon for retaining the clevis pin in position within the bushings 24 and 40.

Figure 4:
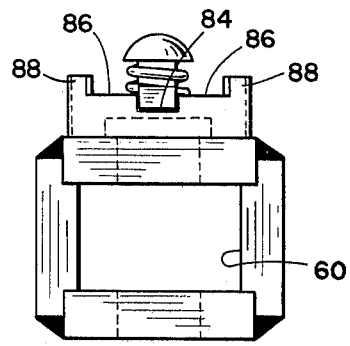
FIG. 4 is an end elevational view of the trunnion shown in FIGS. 2 and 3.

The bar 28 is provided with a plurality of longitudinally spaced apertures 50 for a purpose as will be hereinafter set forth. The slide bar 26 extends longitudinally into housing or trunnion generally indicated at 52, and is longitudinally slidable with respect thereto. The trunnion 52 comprises a pair of mutually parallel plate members 54 and 46 spaced apart by a plurality of spacer plates 58 welded or otherwise secured between the opposite side edges thereof. One end of the trunnion 52 is open as shown at 60 (FIG. 4) for receiving the outer end of the slide bar 26 therethrough. The opposite end of the trunnion 52 is closed by a transversely extending sleeve 62 having a central bore 64 extending therethrough. The sleeve 62 may be disposed between the usual pull rods 61 of the braking apparatus 63 provided for the locomotive wheels (not shown) in much the same manner as is shown in my aforementioned U.S. Pat. No. 3,752,269. A suitable cross head pin 65 may be inserted through the pull rods and through the bore 64 for pivotally securing the sleeve 62 to the pull rods, as is well known. In addition, the plate 54 is provided with at least two spaced apertures 66 in alignment with the plurality of apertures 50 provided in the slide bar 26. The ratio of spacing between the apertures 50 and between the apertures 66 is preferably selected in order to provide a maximum adjustability between the slide bar 26 and the trunnion 52 as will be hereinafter set forth. The plate 56 is similarly provided with at least two spaced apertures 68 in alignment with the apertures 66. The slide bar 28 may be secured between the plates 54 and 56 in substantially any preselected position by positioning one of the apertures 50 in alignment between one set of the bores 66 and 68, and inserting a suitable keeper pin 70 therethrough. The axes of the apertures 50 and the apertures 66 and 68 are always parallel with each other, thus facilitating the alignment therebetween. The keeper pin 70 may be removably retained in position by a keeper lever generally indicated at 72 which extends over the head of the pin 70 as will be hereinafter set forth. The keeper lever 72 is preferably of the type shown in my prior U.S. Pat. No. 3,902,577, and comprises a keeper lever arm 74 pivotally secured to the plate 54 in the proximity of an upstanding flange 76 and on the opposite side thereof with respect to the apertures 66. The lever 74 may be pivotally secured to the plate 54 in any suitable manner, such as by a pivot shaft 78 secured to the plate 54 in any well-known manner and having a stop member 80 provided on the outer end thereof. A suitable helical spring 82 is disposed around the shaft 78 and interposed between the lever 74 and the stop 80 for constantly urging the lever 74 into engagement with the outer surface of the plate 54. The lever 74 may be of any suitable configuration; and as shown herein, comprises a main apertured plate portion 84 at one end of the lever arm 74 and pivotally disposed around the shaft 78. The arm 74 extends outwardly and angular from the plate 84 in a direction generally toward the flange 76 for selective engagement therewith. The spring 82 constantly urges the lever arm 74 against the exposed edge of the flange 76.

The flange 76 is substantially V-shaped, and the outer or exposed edge thereof is recessed or stairstepped to provide a centrally disposed groove 84 (FIG. 4), and a pair of substantially identical intermediate steps 86 on the opposite sides of the groove 84, each step 86 having an outwardly extending shoulder 88 providing stop members for a purpose as will be hereinafter set forth.

The device 10 is connected between the pull rods 61 of the locomotive braking apparatus 63 and the safety strap 16 in order to adjust the position of the brake shoes 67 with respect to the locomotive truck wheels (not shown) for the purpose as set forth in my aforementioned patents. A pair of brackets 18 are welded or otherwise rigidly secured to the opposite sides or ends of the safety strap 16 as particularly shown in FIG. 1 and extend outwardly therefrom in opposite directions toward the respective in-line wheels of the locomotive truck. A slide bar apparatus 26 is pivotally secured to each of the brackets 18 by positioning the outer end of the bracket 18 between the arms 32 and 34 of the respective bifurcated member 30 whereby the bushings 24 and 40 will be in substantial axial alignment. The clevis pin 42 may be inserted through the aligned bushings and secured therein by a suitable lock nut, or the like (not shown) as is well known.

Figure 3:
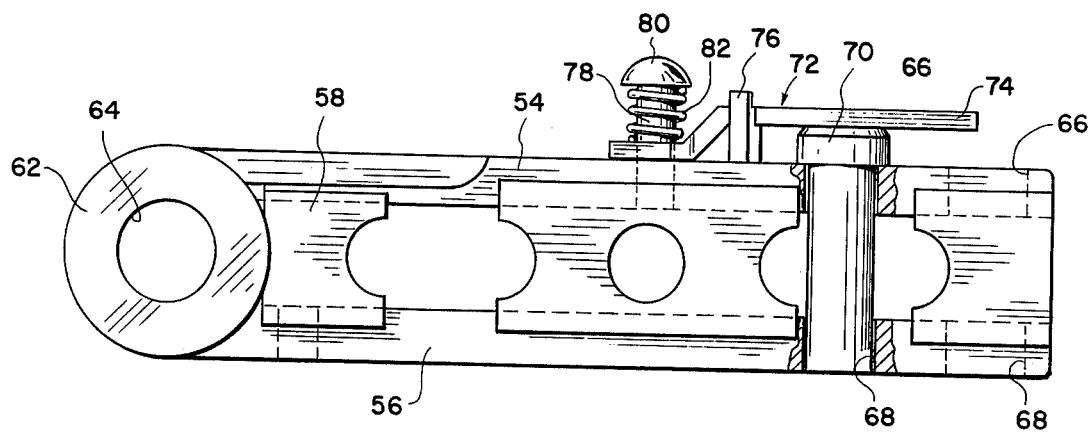
FIG. 3 is a side elevational view of the trunnion shown in FIG. 2.

A housing or trunnion assembly 52 may then be slidably disposed over each slide bar apparatus 26, and the sleeve 62 may be secured to the pull rods 61 in the general manner as set forth in my U.S. Pat. Nos. 3,613,840 and 3,752,269. The relative longitudinal position between the respective trunnions 52 and slide apparatus 26 may be selected as desired to provide the appropriate braking effect for the respective locomotive truck wheel, and the trunnion and slide apparatus may be securely locked in the selected position by inserting the keeper pin 70 through the aligned bores 66 and 68 and the most nearly aligned bore 50 with respect thereto. The keeper lever 74 may be positioned against the head of the keeper pin 70 as shown in FIG. 3, thus securely retaining the pin in position for locking the trunnion 52 and slide bar assembly 26 in the selected position therebetween.

When it becomes necessary to adjust the position of the brake shoes for any reason, the keeper lever 74 may be pivoted to a position out of engagement with the keeper pin 70, and the pin 70 may be removed from the bores 50, 66, and 78, thus releasing the locking engagement between the trunnion 52 and slide bar apparatus 26. The relative longitudinal position between the trunnion 52 and slide bar 26 may be manually adjusted as required, and the keeper pin 70 may be reinserted in the proper aligned bores for locking the trunnion and slide bar together. The keeper lever 74 may be repositioned against the head of the keeper pin 60 for securely retaining the pin in the locking position.

From the foregoing, it will be apparent that the present invention provides a novel brake adjuster for locomotives wherein the double shoe clasp-type braking assembly has been converted to a single brake shoe assembly. The novel brake adjuster comprises bracket means rigidly secured to the opposite ends of the usual safety strap for pivotally supporting a slide bar assembly from each end of the safety strap. The slide bar assembly of each bracket extends in a direction toward the respective in-line wheel of the locomotive truck and is slidably disposed within a trunnion member which, in turn, is pivotally secured to the pull rods of the braking apparatus. Keeper pin means cooperates between the slide bar and respective trunnion for securely locking the trunnion and slide bar in substantially any desired longitudinal relationship therebetween. When the brake shoes are to be adjusted for any reason, the keeper pin means may be released whereby the relative longitudinal position between the trunnion and slide bar may be quickly and easily adjusted as required to provide the desired braking effect. The trunnion and slide bar may then be locked in the newly selected position by re-engagement of the keeper pin means.

Whereas the present invention has been described in particular relation to the drawings attached hereto, it should be understood that other and further modifications, apart from those shown or suggested herein may be made within the spirit and scope of this invention.

What is claimed is:

1. In combination with a locomotive braking apparatus converted from a double shoe clasp-type assembly to a single brake shoe assembly and having safety strap means therefor, the improvement comprising a slack adjuster device operably connected between the safety strap means and the converted braking apparatus and comprising a pair of substantially triangular bracket plate members rigidly secured to the opposite ends of the safety strap means and extending outwardly therefrom in opposite directions, elongated slide bar means pivotally secured to each bracket member and extending outwardly therefrom, trunnion means pivotally secured to the converted braking apparatus and having one open end for receiving a slide bar means therein, one of said trunnion means being slidably disposed on each of said slide bar means, and keeper pin means cooperating between the slide bar means and trunnion means for locking thereof in substantially any preselected longitudinal position therebetween.

2. A slack adjuster device as set forth in claim 1 wherein the slide bar means and trunnion means are provided with complementary aligned bores for cooperation with the keeper pin means to provide said locking position therebetween.

3. In combination with a locomotive braking apparatus converted from a double shoe clasp-type assembly to a single brake shoe assembly and having safety strap means therefor, the improvement comprising a slack adjuster device operably connected between the converted braking apparatus and the safety strap means and comprising slide bar means pivotally secured to the safety strap means and extending outwardly therefrom, trunnion means pivotally secured to the braking apparatus and having one end open for slidably receiving the slide bar means therein, keeper pin means cooperating between the slide bar means and trunnion means for locking thereof in substantially and desired relative longitudinal position therebetween to provide preselected locking positions for the adjuster, and wherein the slide bar means comprises bracket means rigidly secured to said safety strap means for pivotally securing the adjuster thereto, substantially flat elongated bar means pivotally secured to said bracket means and extending slidably into said trunnion means, said elongated bar means provided with a plurality of spaced apertures for cooperating with said keeper pin means for providing said locking position with said trunnion means, bifurcated means provided at one end of said elongated bar means for receiving said bracket means therein, clevis pin means cooperating between the bifurcated means and bracket means for pivotally securing said elongated bar means to said bracket means, and wherein the bracket means comprises a pair of substantially identical flat plates of substantially triangular planar configuration rigidly secured to the opposite ends of said safety strap means and extending outwardly therefrom in opposite directions, each of said plates being provided with an aperture, and bushing means disposed in said aperture for receiving said clevis pin means therethrough for pivotally securing an elongated bar means to each of said flat plates.

* * * * *